United States Patent
Liu et al.

(10) Patent No.: US 9,898,352 B2
(45) Date of Patent: Feb. 20, 2018

(54) INTERFACE CALL SYSTEM AND METHOD

(71) Applicant: ZTE Corporation, Shenzhen, Guangdong Province (CN)

(72) Inventors: Zhiyang Liu, Shenzhen (CN); Bin Gao, Shenzhen (CN); Xing Li, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 14/902,314

(22) PCT Filed: Apr. 8, 2014

(86) PCT No.: PCT/CN2014/074912
§ 371 (c)(1),
(2) Date: Dec. 30, 2015

(87) PCT Pub. No.: WO2015/000314
PCT Pub. Date: Jan. 8, 2015

(65) Prior Publication Data
US 2016/0371129 A1 Dec. 22, 2016

(30) Foreign Application Priority Data
Jul. 5, 2013 (CN) .......................... 2013 1 0282125

(51) Int. Cl.
*G06F 9/54* (2006.01)
*G06F 9/445* (2018.01)
(Continued)

(52) U.S. Cl.
CPC .................. *G06F 9/54* (2013.01); *G06F 8/67* (2013.01); *G06F 9/4443* (2013.01); *G06F 9/44505* (2013.01); *G06F 9/505* (2013.01)

(58) Field of Classification Search
None
See application file for complete search history.

(56) References Cited

U.S. PATENT DOCUMENTS 5,974,251 A * 10/1999 Ohta .................... G06F 17/2264
717/109
6,032,198 A * 2/2000 Fujii ......................... G06F 8/20
717/108
(Continued)

FOREIGN PATENT DOCUMENTS

| CN | 1866221 | 11/2006 |
|---|---|---|
| CN | 101315604 | 12/2008 |
| CN | 102063294 | 5/2011 |

OTHER PUBLICATIONS

Oracle, "Developing CORBA Applications", 1999, pp. 1-35.*
(Continued)

*Primary Examiner* — H S Sough
*Assistant Examiner* — Phuong N Hoang
(74) *Attorney, Agent, or Firm* — Koppel, Patrick, Heybl & Philpott

(57) ABSTRACT

Provided is a system and method for interface call, relating to the enterprise management technology field. The system includes: an interface management component which is configured to generate a description file and a call process indication of an interface according to an interface modification requirement of a user, and deploy the description file and the call process indication to an interface execution component, wherein the description file includes configuration replacement information of the interface; and the interface execution component, which is configured to configure the interface according to the description file, and call the interface according to the call process indication.

4 Claims, 2 Drawing Sheets

(51) Int. Cl.
   *G06F 9/50*      (2006.01)
   *G06F 9/44*      (2018.01)

(56) References Cited

U.S. PATENT DOCUMENTS

| | | | | |
|---|---|---|---|---|
| 7,987,451 | B1* | 7/2011 | Dalcher | G06F 9/4425 |
| | | | | 717/126 |
| 2004/0177352 | A1* | 9/2004 | Narayanaswamy | G06F 8/61 |
| | | | | 717/169 |
| 2005/0210462 | A1* | 9/2005 | Chupa | G06F 8/61 |
| | | | | 717/171 |
| 2007/0156872 | A1* | 7/2007 | Stoyanova | G06F 17/3089 |
| | | | | 709/223 |
| 2007/0209044 | A1* | 9/2007 | Honishi | G06F 8/30 |
| | | | | 719/330 |

OTHER PUBLICATIONS

Owens II, et al., "Generating Valid Interface Definition Language from Succinct Models", IEEE, 2011, pp. 205-211.*
International Search Report for PCT/CN2014/074912, dated Jul. 11, 2014.

* cited by examiner

INTERFACE CALL SYSTEM AND METHOD

TECHNICAL FIELD

The present disclosure relates to the enterprise management technology field, and provides a system and method for interface call.

BACKGROUND

In enterprises (especially telecom enterprises), software systems of different providers are usually used for assisting work, but a software system of one provider usually needs to access data of other providers by way of an interface, so the following problems will occur:

1. Interface access protocols needed by the software systems of each provider are different, so it needs to configure different interfaces aiming at each protocol, which causes a very high maintenance cost.

2. Because of the lack of real-time monitoring to each interface, once an exception to the access through an interface occurs, a maintainer of an interface caller cannot be informed in time, which slows down the rate of identifying and solving problems.

SUMMARY

The embodiments of present disclosure provide a system and method for interface call, which can call an access component and a protocol of an interface.

The embodiments of the present disclosure provide a system for interface call, which includes:

an interface management component, configured to generate a description file and a call process indication of an interface according to an interface modification requirement of a user, and deploy the description file and the call process indication to an interface execution component, wherein the description file includes configuration replacement information of the interface; and the interface execution component, configured to configure the interface according to the description file, and call the interface according to the call process indication.

In an example embodiment, the interface management component includes:

an information management sub-component, configured to provide the user, via an interface, the current configuration information of the interface and configuration information available for the interface call, and acquire configuration modification information of the interface that the user inputs; wherein the configuration modification information includes access component replacement information and protocol replacement information of the interface;

an interface configuration sub-component, configured to generate the description file according to the configuration replacement information, and make the call process indication for the interface; and an interface deployment sub-component, configured to deploy the description file and the call process indication to the interface execution component.

In an example embodiment, the interface execution component includes: a parse sub-component, a call sub-component and at least one execution engine;

wherein the parse sub-component is configured to parse the description file and generate an interface call code; the call sub-component is configured to select one target execution engine according to load state of the at least one execution engine, and send the interface call code and the call process indication to the target execution engine; each of the at least one execution engine is configured to, when being selected as the target execution engine, configure and call the interface according to the interface call code, and call the interface according to the call process indication.

In an example embodiment, the system further includes:
a log library, configured to record data log generated by the interface execution component.

In an example embodiment, the system further includes:
a monitoring and alarming component, configured to monitor data stored in the log library, and give an alarm when it is determined that a data exception occurs.

The embodiments of the present disclosure also provide a method for interface call, which includes:

the description file and the call process indication of the interface are generated according to the interface modification requirement of the user, and the description file and the call process indication are deployed to the interface execution component; wherein the description file includes the configuration replacement information of the interface;

the interface is configured according to the description file, and the interface is called according to the call process indication.

In an example embodiment, generating the description file and the call process indication of the interface according to the interface modification requirement of the user includes:

current configuration information of the interface and the configuration information available for the interface call are provided to the user via an interface, and the configuration modification information of the interface that the user inputs is acquired; wherein the configuration modification information includes the access component replacement information and the protocol replacement information of the interface; and the description file is generated according to the configuration replacement information, and the call process indication is made for the interface.

In an example embodiment, configuring the interface according to the description file and calling the interface according to the call process indication includes:

at least one execution engines are provided;
the description file is parsed and the interface call code is generated;

one target execution engine is selected according to load state of the at least one execution engine, the interface call code and the call process indication are sent to the target execution engine, so that the target execution engine can configure and call the interface according to the interface call code, and the interface is called according to the call process indication.

In an example embodiment, the method further includes:
the data log which is generated by the interface execution component is recorded.

In an example embodiment, the method further includes:
the data log is monitored, and an alarm is given when it is determined that a data exception occurs.

The solutions provided by the embodiments of the present disclosure have the following advantages:

In the system and method provided by the embodiments of the present disclosure, an interface is reconfigured according to user requirements, the interface is called after being reconfigured, and the access component of the interface is modified, thereby enabling data interaction between different systems and improving work efficiency in office work of enterprises. In addition, the system of the present disclosure is simple in structure and the method is easy to implement, so a input cost of the system in enterprises can be saved.

DETAILED DESCRIPTION OF EMBODIMENTS

For making the technical problems to be solved, the technical solutions and the advantages of the present disclosure more clear, a detailed description is given below in combination with embodiments and accompanying drawings.

Figure 1:
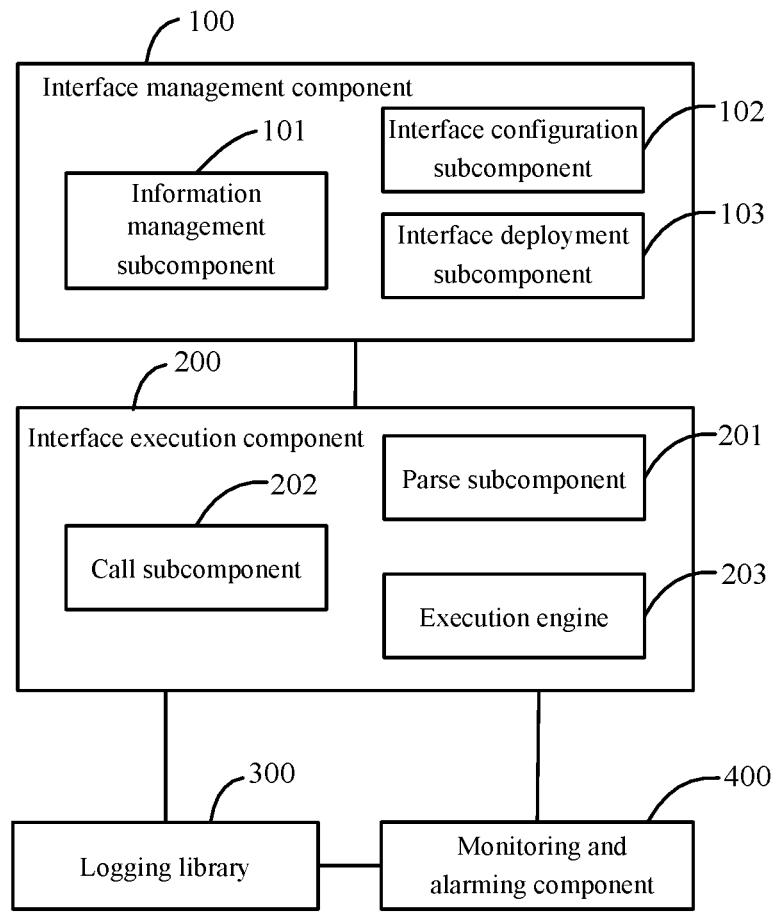
FIG. 1 is a structural diagram of a system for interface call in the present disclosure.

As shown in FIG. 1, a system for interface call according to the present disclosure includes:

the interface management component 100, which is configured to generate the description file and a call process indication of the interface according to the interface modification requirement of the user, and deploy the description file and the call process indication to the interface execution component 200, wherein the description file includes the configuration replacement information of the interface;

the interface execution component 200, which is configured to configure the interface according to the description file, and call the interface according to the call process indication.

The system reconfigures the interface according to user requirements, calls the interface after the interface is reconfigured, and modifies the access component of the interface, thereby enabling the data interaction between different systems and improving work efficiency in office work of enterprises. In addition, the system of the present disclosure is simple in structure, so an input cost of the system in enterprises can be saved.

As shown in FIG. 1, in the embodiments of the present disclosure, the interface management component 100 specifically includes:

the information management sub-component 101, which is configured to provide the user, via an interface, current configuration information of the interface and the configuration information available for the interface call, and acquire the configuration modification information of the interface that the user inputs; wherein the configuration modification information includes the access component replacement information and the protocol replacement information of the interface;

the interface configuration sub-component 102, which is configured to generate the description file according to the configuration replacement information, and make the call process indication for the interface; and the interface deployment sub-component 103, which is configured to deploy the description file and the call process indication to the interface execution component.

As shown in FIG. 1, in the embodiments of the present disclosure, the interface execution component 200 specifically includes: the parse sub-component 201, the call sub-component 202 and at least one execution engine 203;

wherein the parse sub-component 201 is configured to parse the description file and generate the interface call code; the call sub-component 202 is configured to select one target execution engine according to load state of the at least one execution engine 203, and send the interface call code and the call process indication to the target execution engine; each of the at least one execution engine 203 is configured to, when being selected as the target execution engine, configure and call the interface according to the interface call code, and call the interface according to the call process indication.

For enterprises, multiple interfaces are usually needed to perform different access tasks between different system components at the same time, so the present embodiment configures multiple execution engines, and the call sub-component assigns the interface call code and the call process indication to relatively idle execution engines, thereby ensuring that a multiple-interface scheduling task can be performed orderly and reasonably.

As shown in FIG. 1, in the embodiments of the present disclosure, the system further includes:

the log library 300, which is configured to record the data log generated by the interface execution component 200.

Because both the configuration and the specific call process of the interface are executed by the interface execution component 200, the log library 300 of the embodiment can provide an effective basis for future system optimization and product quality improvement by recording data log (e.g. performance and flow of interface call) which is generated by the execution component 200.

As shown in FIG. 1, in the embodiments of the present disclosure, the system further includes:

the monitoring and alarming component 400, which is configured to monitor the data stored in the log library 300, and give an alarm when it is determined that a data exception occurs.

The monitoring and alarming component 400 of the present embodiment monitors and analyzes the data log, and if the call process of the interface indicates that an exception occurs (e.g. network quality and average execution time reach an alarm value or the interface malfunctions), informs a manager immediately, so as to solve the problem in time.

The system of the present disclosure is described below in detail.

As shown in FIG. 1, the system of the present embodiment is divided into four parts, namely the interface management component 100, the interface execution component 200, the log library 300 and the monitoring and alarming component 400.

Wherein the interface management component 100 mainly includes: the information management sub-component 101, the interface configuration sub-component 102, and the interface deployment sub-component 103. The information management sub-component 101 provides, via a user interface, the current configuration information of the interface (such as manufacturer description information of the interface, a protocol type, a Uniform Resource Identifier (URI) address, a method description, an incoming parameter description, and an outgoing parameter description) by taking a display screen as a carrier to the user; in addition, the information management sub-component can also provide a function of registering information (such as caller description information, and an expected protocol used by the access interface) about the interface caller (namely the user) and managing an interface state.

The interface configuration sub-component 102 is mainly configured to generate the call process indication and the configuration modification information of the interface according to the interface configuration information needed by the user. Wherein, the user selects the interface configuration needing to be modified by dragging components in the user interface;

if the call process indication is specifically accessing a database to store, the user can drag a configuration component to which the access through a database interface relates in the user interface to perform a custom selection (e.g. configuring a Internal Protocol (IP) address of the database, a port of the database, an instance name of the database, an access user and an access password, an incoming parameter name and an incoming parameter data type in the storage process, an outgoing parameter name and an outgoing parameter data type in the storage process, and other information); after the above configuration is completed, an Extensive Markup Language (XML) description file can be made by the interface configuration sub-component 102. In addition, the user can also drag a protocol replacement component in the user interface to select a protocol needed by the interface (e.g. if the user expects to use a HyperText Transfer Protocol (HTTP) protocol to access the database storage process, then the user finds a related component of the HTTP protocol in the interface, and drags the related component in an item of the configuration modification information of the interface, then the interface configuration sub-component 102 starts to configure a name of an HTTP method, the incoming and outgoing parameters of the HTTP method, a mapping relation between the incoming parameter and the outgoing parameter in the storage process, and other information after interface conversion). Likewise, the interface configuration sub-component 102 makes these HTTP protocol replacement information into the same XML description file. Finally, the interface configuration sub-component 102 makes the specific call process indication for the interface: e.g. the implementation process of changing an interface access component.

The interface deployment sub-component 103 provides a hot deployment function; after uploading, via the user interface, the XML description file and the call process indication which are generated by the interface configuration sub-component 102, the user clicks a deployment button, and then the interface deployment sub-component 103 deploys the XML description file and the call process indication to the interface execution component 200.

The interface execution component 200 mainly includes the parse sub-component 201, the call sub-component 202, and at least one execution engines 203.

The parse sub-component 201 is configured to parse the XML description file from the interface deployment sub-component, and generate the interface call code which can be read by the at least one execution engine 203.

The call sub-component 202 serves as a mediator of the call process indication of the interface, adjusts a load distribution principle any time according to the load state of each execution engine 203, binds the interface call code and the call process indication to a execution engine 203 with the smallest load among the at least one execution engine, and uploads an execution result returned by the execution engine 203 to the user via a display screen.

After receiving the interface call code transmitted from the call sub-component 202, the execution engine 203 configures the interface, then calls the interface according to the call process indication and returns the execution result to the call sub-component 202. When there are more interfaces that the system needs to access, multiple execution engines 203 can be started.

The log library 300 records log data generated by each sub-component in the interface execution component 200.

The monitoring and alarming component 400 analyzes a running state of the interface mainly according to the log data in the log library 300; once it is found that an exception (e.g. the network quality and the average execution time reach the alarm value or the interface malfunctions) occurs in the interface call process, the monitoring and alarming component can generate alarm information according to a preconfigured message template, and push the alarm information to a maintainer in time through a multimedia sending channel (e.g. sending a short message, sending an e-mail, and so on), so that the maintainer processes failures quickly or takes measures for preventing failure in advance. In addition, the user can also observe, via the information management sub-component 101, a call state of the interface in real time at the interface.

To sum up, the system of the embodiments has the following advantages:

1. providing a visual interface information configuration, setting in the interface the configuration information (including, but not limited to, interface access information and interface protocol conversion information) which is needed by the interface call, and automatically generating the XML description file by the system after the configuration is completed.

2. providing a hot deployment mode for interface application, loading the XML description file to a background, parsing the XML description file through the background and calling a third-party interface, thereby being able to adapt to a massive interface call work in enterprises; on the other hand, replacing a protocol of the interface with a protocol expected by the user, so as to facilitate a caller to use;

3. being able to prevent exception to the interface call in time, and inform the maintainer in time; in addition, the maintainer can also analyze the log data, and find an optimized solution for interface application, thereby continuously improving product quality and user satisfaction.

Figure 2:
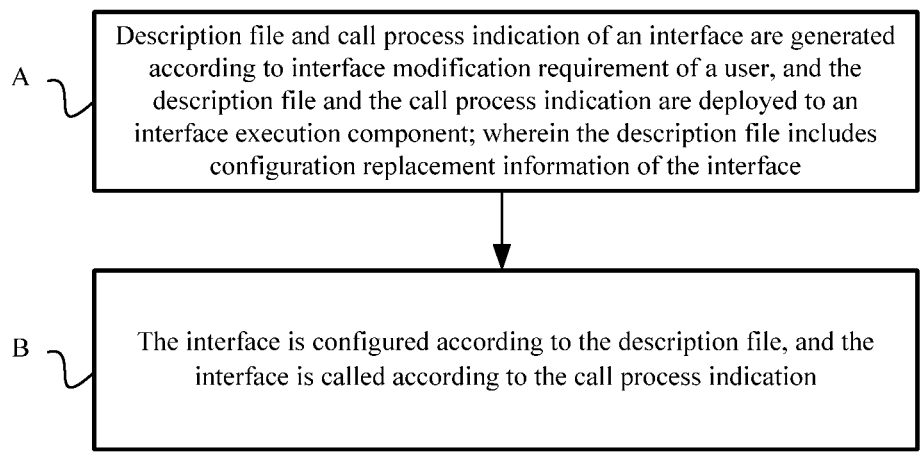
FIG. 2 is a step diagram of a method for interface call in the present disclosure.

In addition, as shown in FIG. 2, the embodiments of the present disclosure also provide a method for interface call, which includes the following steps:

Step A: description file and call process indication of an interface are generated according to interface modification requirement of a user, and the description file and the call process indication are deployed to an interface execution component; wherein the description file includes configuration replacement information of the interface;

Step B: the interface is configured according to the description file, and the interface is called according to the call process indication.

The above method reconfigures the interface according to user requirements, calls the interface after the interface is reconfigured, and modifies the access component of the interface, thereby enabling the data interaction between different systems and improving work efficiency in office work of enterprises. In addition, the method of the present disclosure is easy to implement, so the input cost of the system in enterprises can be saved.

Figure 3:
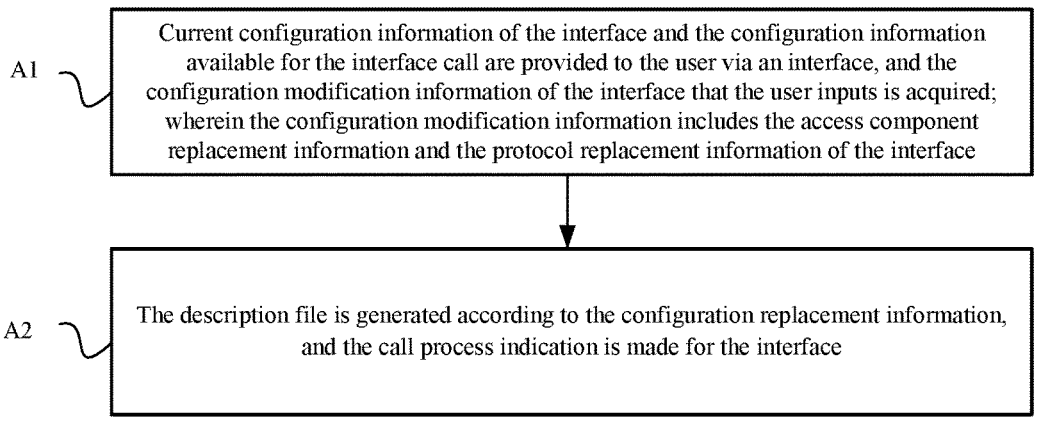
FIG. 3 is a specific step diagram of generating a description file and a call process indication of an interface according to an interface modification requirement of a user in the present disclosure.

Furthermore, as shown in FIG. 3, in the embodiments of the present disclosure, Step A specifically includes the following steps:

Step A1: current configuration information of the interface and the configuration information available for the interface call are provided to the user via an interface, and the configuration modification information of the interface that the user inputs is acquired; wherein the configuration modification information includes the access component replacement information and the protocol replacement information of the interface; and Step A2: the description file is generated according to the configuration replacement information, and the call process indication is made for the interface.

Figure 4:
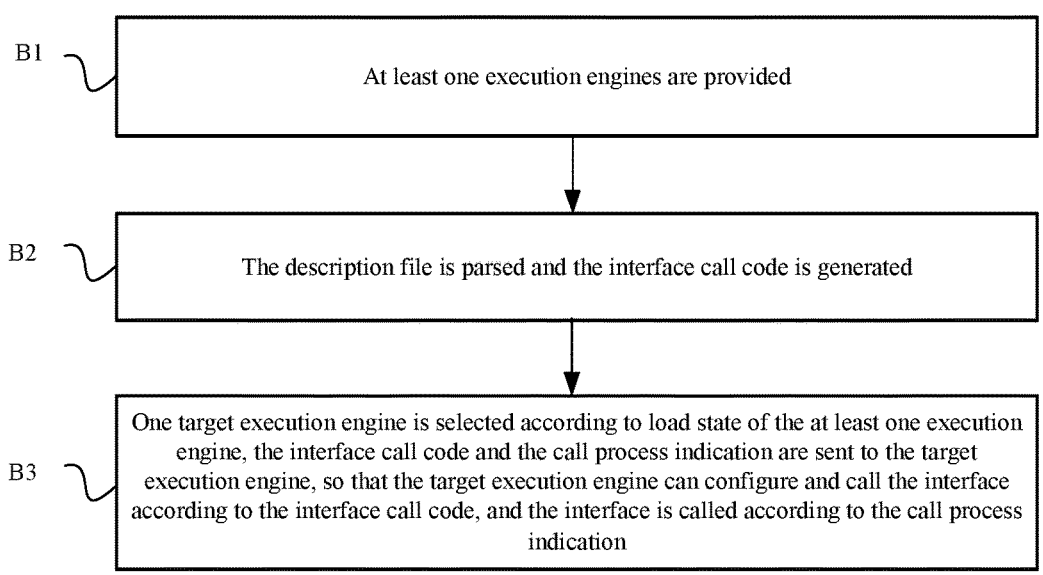
FIG. 4 is a specific step diagram of configuring the interface according to the description file, and calling the interface according to the call process indication in the present disclosure.

Furthermore, as shown in FIG. 4, in the embodiments of the present disclosure, Step B specifically includes the following steps:

Step B1: at least one execution engines are provided;

Step B2: the description file is parsed and the interface call code is generated;

Step B3: one target execution engine is selected according to load state of the at least one execution engine, the interface call code and the call process indication are sent to the target execution engine, so that the target execution engine can configure and call the interface according to the interface call code, and the interface is called according to the call process indication.

For enterprises, multiple interfaces are usually needed to perform different access tasks between different system components at the same time, so the present embodiment configures multiple execution engines, and the interface call code and the call process indication are assigned to the relatively idle execution engines, so that the stable execution of interface scheduling can be ensured.

Figure 5:
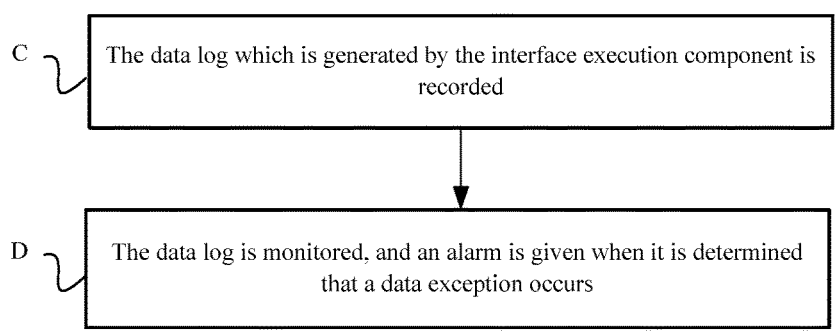
FIG. 5 is another step diagram of the method for interface call in the present disclosure.

In addition, for supporting future system optimization and product quality improvement, as shown in FIG. 5, in the embodiments of the present disclosure, the method further includes:

Step C: the data log which is generated by the interface execution component is recorded.

In addition, for being able to solving an exception occurring in the interface call process in time, as shown in FIG. 5, in the embodiments of the present disclosure, the method further includes:

Step D: the data log is monitored, and an alarm is given when it is determined that a data exception occurs.

Obviously, the above embodiment is an embodiment of the method corresponding to the system for interface call in the present disclosure; the method in the present embodiment can also achieve the technical effects that the system for interface call can achieve.

The above is the example embodiments of the present disclosure; it should be noted that, on the premise of not departing from the principles of the present disclosure, the skilled person in the art may also make a number of improvements and supplements, and these improvements and supplements shall fall within the protection scope of the present disclosure.

The invention claimed is:

1. A method for interface call, comprising:
generating a description file and a call process indication of an interface according to an interface modification requirement of a user, and deploying the description file and the call process indication to an interface execution component, wherein the description file comprises configuration replacement information of the interface; and
configuring the interface according to the description file, and calling the interface according to the call process indication;
wherein configuring the interface according to the description file and calling the interface according to the call process indication comprises:
providing at least one execution engine;
parsing the description file and generating an interface call code;
selecting one target execution engine according to load state of the at least one execution engine; and
sending the interface call code and the call process indication to the target execution engine, so that the target execution engine can configure and call the interface according to the interface call code, and call the interface according to the call process indication.

2. The method as claimed in claim 1, wherein generating the description file and the call process indication of the interface according to the interface modification requirement of the user comprises:
providing to the user, via a user interface (UI), current configuration information of the interface and configuration information available for the interface call, and acquiring configuration modification information of the interface that the user inputs; wherein the configuration modification information comprises access component replacement information and protocol replacement information of the interface; and
generating the description file according to the configuration replacement information, and making the call process indication for the interface.

3. The method as claimed in claim 1, wherein the method further comprises:
recording a data log generated by the interface execution component.

4. The method as claimed in claim 1, wherein the method further comprises:
monitoring a data log, and giving an alarm when it is determined that a data exception occurs.

\* \* \* \* \*